(12) United States Patent
Inazumi (10) Patent No.: US 6,493,362 B1
(45) Date of Patent: Dec. 10, 2002

(54) DATA RECORDING METHOD AND DATA RECORDING SYSTEM

(75) Inventor: Atsushi Inazumi, Tokyo (JP)

(73) Assignee: Pioneer Electronic Corporation, Tokyo (JP)

(*) Notice: Subject to any disclaimer, the term of this patent is extended or adjusted under 35 U.S.C. 154(b) by 0 days.

(21) Appl. No.: 09/266,782

(22) Filed: Mar. 12, 1999

(30) Foreign Application Priority Data

Mar. 20, 1998 (JP) .......................................... 10-072797

(51) Int. Cl.⁷ .................................................. H04J 1/16
(52) U.S. Cl. ........................................ 370/537; 370/503
(58) Field of Search ................................ 370/535, 537, 370/389, 390, 400, 398, 399, 503, 350, 480, 518, 519, 520, 442, 347, 337, 321, 336, 344, 345; 348/384.1, 387.1, 388.1, 390.1, 394.1

(56) References Cited

U.S. PATENT DOCUMENTS 5,844,620 A * 12/1998 Coleman et al. ............. 348/461
5,943,047 A *  8/1999 Suzuki ......................... 345/327
6,205,144 B1 *  3/2001 Mohrmann ................... 370/503

* cited by examiner

*Primary Examiner*—Dang Ton
(74) *Attorney, Agent, or Firm*—Morgan, Lewis & Bockius LLP (57) ABSTRACT

A data recording method and a data recording system are provided to allow one data to be extracted and recorded out of signals including a plurality of time-division multiplexed data. One example is that packets composing one program data can be extracted and recorded out of TS data in which a plurality of program data are time-division multiplexed by a transport stream in the MPEG. When a PCR is disposed in the extracted packet, the value of the PCR is replaced with a new PCR value generated based on a bit rate and other information at the time of recording.

13 Claims, 3 Drawing Sheets

DATA RECORDING METHOD AND DATA RECORDING SYSTEM

This Application claims the benefit of Japanese application no. 10-072797 filed on Mar. 20, 1998, which is hereby incorporated by reference.

BACKGROUND OF THE INVENTION

1. Field of the Invention

The present invention relates to a data recording method and a data recording system, and more particularly, relates to a data recording method and a data recording system for extracting and recording one data out of a plurality of time-division multiplexed data.

2. Description of the Related Art

MPEG 2 standard is an international standard (ISO/IEC 13818-1) proposed by the moving picture expert group (MPEG). It is a coding system for compressing digital video and digital audio signals.

The MPEG 2 standard adopts a time-division multiplexing system using packets. For instance, video and audio signals are divided into streams called packets. The packets have an adequate length for multiplexing the video and audio signals. The packets of the video signal and of the audio signal are then transmitted in a time-division manner while being switched appropriately.

The MPEG 2 standard also adopts a multiplexing and separating system which can accommodate multi-programming in order to transmit a plurality of program data. The use of this system allows not only video and audio signals composing one program data to be transmitted in the time-division manner, but also video and audio signals composing a plurality of programs to be transmitted in the time-division manner.

A system called "transport stream system" is one of such multiplexing and separating systems which can accommodate multi-programming. According to the transport stream system, a packetized elementary stream (PES) packet is divided further into a plurality of packets in order for the system to transmit a plurality of program data in the time-division manner. Each packet has a fixed length which is relatively short, i.e., 188 bytes.

In order to receive and reproduce the program data transmitted in the time-division manner in the transport stream system, it is necessary to synchronize an encoder provided in a transmitter and a decoder provided in a receiver (reproducing unit). In the transport stream system, information for setting and calibrating a clock reference is called a program clock reference (PCR). The PCR is transmitted to synchronize the encoder and the decoder.

It is necessary to control the value of the PCR and the time when the PCR arrives at the decoder accurately in order to synchronize the encoder and the decoder by using the PCR. More specifically, the PCR is data of six bytes and the decoder must set the value of the PCR therein at the time when the final byte of the PCR has arrived. Then, using the PCR arrival time and the value of the PCR, the decoder sets or calibrates a system time clock (STC) which is the basis on which the decoding and reproducing processes within the decoder are performed.

More specifically, the decoder has a phase locked loop (PLL) circuit in which a counter outputting the STC is built in. Every time when the PCR arrives, the PLL circuit calculates a difference between the value of the PCR and the value of the STC, converts its result into a control signal, and performs a feedback control based on this control signal. This creates a STC which coincides completely with the PCR arrival period. Consequently, the encoder provided in the transmitter and the decoder provided in the receiver can be synchronized with a high precision.

A technology for receiving multiplexed data transmitted by using the multi-programming multiplexing and separating system as described above and for recording the received multiplexed data is now being developed. When such technology is established, it becomes possible for a broadcasting station to provide a digital satellite broadcasting service to multiplex and transmit a plurality of movies recorded in digital signals to individual users at home. Also, it becomes possible for individual users to record the movies transmitted from the broadcasting station in the digital signals as received.

Two methods have being proposed for recording the multiplexed data transmitted by using the multi-programming multiplexing and separating system.

A first method is to record all of the transmitted multiplexed data. This method, however, has problems in that the amount of data becomes too large because all of the multiplexed data is recorded including unnecessary program data contained in the multiplexed plurality of program data.

A second method is to extract and record one program data out of the transmitted multiplexed data. This method allows recording of only the necessary and desired program data. Thus, the amount of recorded data is reduced compared to the first method. However, it is difficult to achieve the synchronization by means of the PCR in reproducing the recorded program data.

In other words, when the program data once recorded is to be reproduced, it is necessary to set or calibrate the STC of the reproducing unit based on the reproducing time of the PCR and the value of the PCR in the same manner as the case of receiving and reproducing the multiplexed data transmitted from the transmitter. However, when extracting and recording one program data out of the time-division multiplex signals, the relationship between the reproducing time of the PCR and the value of the PCR is destroyed. As a result, the STC of the reproducing unit cannot be set or be calibrated based on the PCR, and the program data cannot be reproduced.

SUMMARY OF THE INVENTION

Accordingly, the present invention is directed to a data recording method and a data recording system that substantially obviates one or more of the problems due to limitations and disadvantages of the related art.

An object of the present invention is to provide a data recording method and a data recording system which allow one specific data to be extracted and recorded out of multiplexed data in which a plurality of data are time-divided. Also, the present invention allows the recorded data to be reproduced with a high precision.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a data recording method of the present invention performs the function of receiving multiplexed data arranged such that (i) a plurality of program data are time-division multiplexed by packets, (ii) a plurality of time preset values used in synchronizing one program data with a decoder in decoding at least one program data out of the multiplexed plurality of program data by the decoder are provided in advance at predetermined intervals, and (iii) one program data and the decoder are synchronized based on the value of each time preset value received by the decoder every time when it is received, and extracting the respective packets composing at least one program data and recording the extracted respective packets with a predetermined bit rate. The data recording method of the present invention includes the steps of receiving the time preset values disposed in the multiplexed data; generating a new time preset value based on the time preset values received in the receiving step and on the bit rate; and replacing the time preset value disposed in advance with the new time preset value generated in the generating step in recording the packet in which the time preset value has been disposed in advance out of the respective packets composing one program data.

The plurality of program data are time-division multiplexed by packets in the multiplexed data. The program data include sound data, picture data, image data, character data, control data and signal processing data or data in which all or part of the above are combined.

The time preset values are disposed in advance in the multiplexed data at predetermined intervals and are actually recorded in the packets. For instance, the time preset values are generated by an encoder or the like on the transmitting side and are inserted to the multiplexed data at predetermined intervals. It is noted that there exist packets in which the time preset value is recorded and packets in which no time preset value is recorded in the multiplexed data because the intervals at which the respective time preset values are disposed do not necessarily coincide with the length of each packet.

The time preset values are used to synchronize a specific program data and the decoder in decoding and reproducing the specific program data within the multiplexed data by the decoder. For instance, the decoder decodes and reproduces the specific program data based on a synchronizing signal (es, an internal clock signal) generated within the decoder. Then, the decoder decodes and reproduces the program data while setting or calibrating the synchronizing signal based on the time of receiving the time preset values and based on the values of the time preset values. As a result, the synchronization between the program data and the decoder is established.

In the data recording method of the present invention, at least one program data is extracted out of the multiplexed data in which a plurality of program data are multiplexed. The extracted program data is then recorded with the predetermined bit rate. In this case, it is necessary to generate a new time preset value for establishing synchronization in decoding and reproducing the extracted and recorded program data. This is because the time preset values disposed in advance in the multiplexed data cannot be used for this purpose given that the data array of the program data extracted and recorded out of the multiplexed data is different from the data array of the multiplexed data. This is also because the bit rate at the time of recording is a bit rate of a recording unit itself used in recording the program data.

Therefore, according to the data recording method of the present invention, a new time preset value is set by executing a series of processes from the receiving step through the replacing step described above concurrently with the process of extracting and recording the program data.

In other words, the respective time preset values disposed in the multiplexed data are received at first in the receiving step. Next, a new time preset value is generated in the generating step based on the respective time preset values received in the receiving step and on the above-mentioned bit rate. That is, when the time preset values disposed in advance in the multiplexed data are received, the time when they are received or the values corresponding to the received time is calculated based on the received time preset value and the bit rate. The result is set as the new time preset value in the generating step.

Then, the pre-disposed time preset value is replaced with the new time preset value generated in the generating step in recording the packet with the pre-disposed time preset value among the respective packets composing one program data. Thereby, the pre-disposed time preset value in each packet composing one program data extracted out of the multiplexed data is replaced one after another with the new time preset value calculated based on the bit rate at the time of recording.

Accordingly, when recording of one program data has ended and when the recorded one program data is to be decoded and reproduced with the same bit rate at the time of recording, the synchronization between the one program data and the decoder (reproducing unit) may be established with a high precision. Consequently, the recorded one program data may be decoded and reproduced with a high precision by using the new time preset values disposed in the recorded program data.

It also allows extraction and recording of only one program data out of the multiplexed data in which the plurality of program data are multiplexed. This reduces the amount of data to be recorded.

According to a first aspect of the present invention, the multiplexed data includes a plurality of program data which are time-division multiplexed by packets of a fixed length; and the new time preset value T is calculated in the generating step by using a number of packets N composing one program data extracted from the multiplexed data during the time from when the previous time preset value was received till when the time preset value of this time is received in the receiving step. The new time preset value T is also related to the length L of those packets, time $T_0$ when the previous time preset value was received, and the bit rate R, as follows:

$$T = (N \times L/R) + T_0 \qquad (1)$$

In other words, in the generating step, the data length of the data recorded during the time from when the previous time preset value has been received till when the time preset value of this time is received is calculated by (number of packets N)×(packet length L). Then, the time from when the previous time preset value has been received till when the time preset value of this time is received is calculated by dividing the data length by the bit rate R at the time of recording. Further, the time when the time preset value of this time is received is calculated by adding the time $T_0$ when the previous time preset value has been received to this value. Then, the time when the time preset value of this time is received is set as the new time preset value T.

Using the above calculation, the time preset value used in establishing the synchronization in decoding and reproducing the extracted and recorded program data may be readily generated. It is noted that the time preset value of the previous time does not mean only the time preset value just before the time preset value of this time. The time preset value of the previous time means the time preset values received during the time since when the one program data has started to be recorded till when the time preset value of this time is received. In other words, the previous time preset value can be a time preset value received for the first time since when the one program data has started to be recorded.

Also, the present invention can be used with respect to the multiplexed data including a plurality of program data which have been time-division multiplexed by the transport stream system in the MPEG, and each time preset value is PCR in the MPEG.

More specifically, the packets composing one program data are extracted out of the multiplexed data in which a plurality of program data are time-division multiplexed by the transport stream system in the MPEG. The extracted packets are then recorded with the predetermined bit rate. At this time, the PCR disposed in advance is replaced with the new PCR generated based on the bit rate at the time of recording the packet having the pre-disposed PCR.

According to the present invention, the bit rate can be set by dividing the clock frequency used in counting the value of the respective time preset values arrayed in advance in the multiplexed data. As a result, the bit rate may be set by dividing the clock signal for generating the clock used in counting the values of the respective time preset values arrayed in advance in the multiplexed data. Accordingly, the bit rate may be set with a simple arrangement without providing an additional oscillator. Only a frequency divider is required. Further, the new time preset value generated in the generating step may be set at a value equal to 1/n of the time preset value disposed in advance in the multiplexed data, so that the process for establishing the synchronization in reproducing the program data extracted and recorded out of the multiplexed data may be simplified.

In another aspect, the present invention provides a data recording system which utilizes the data recording method described above.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawings.

Figure 1:
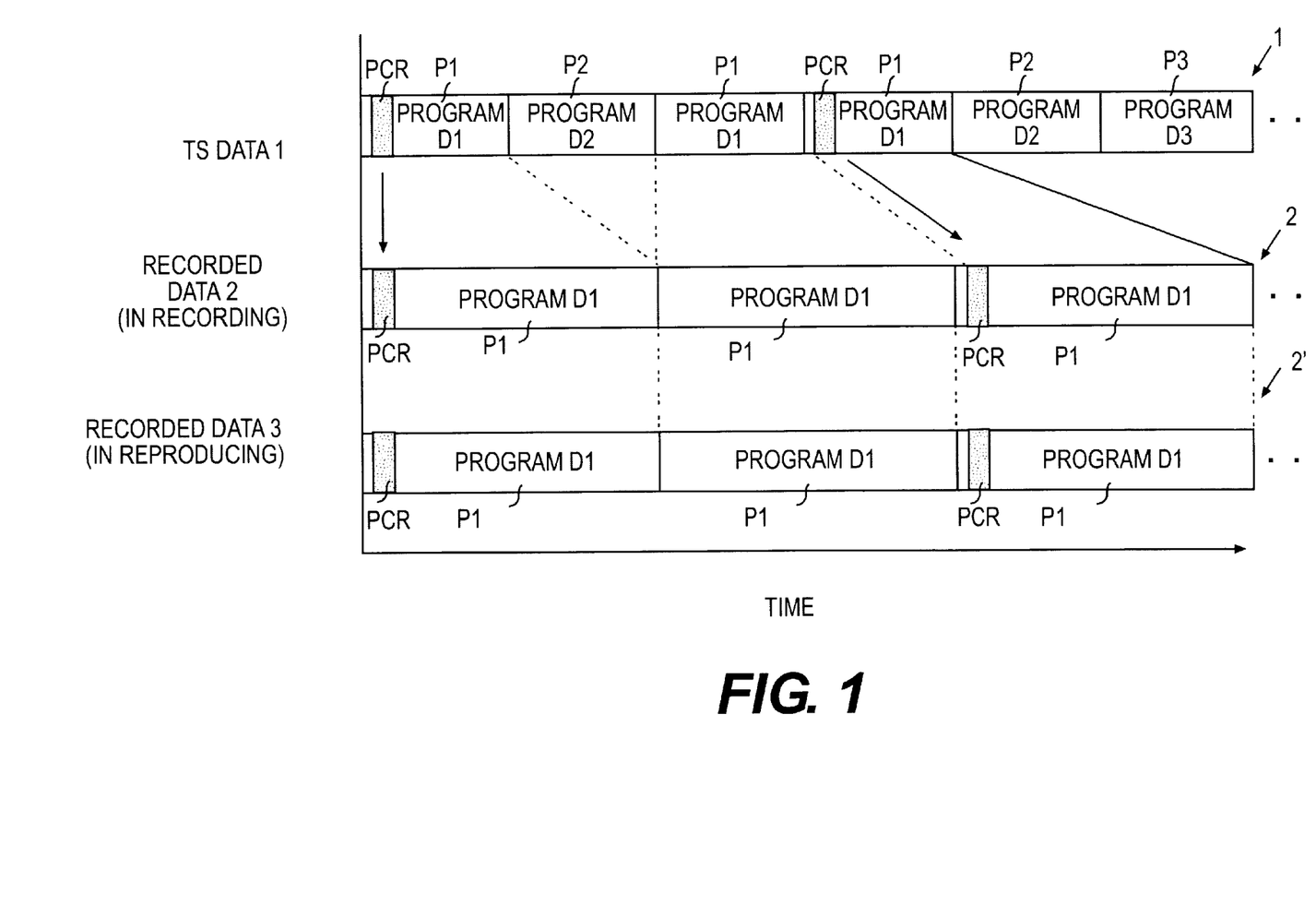
FIG. 1 is an explanatory diagram showing TS data 1 received by a data recording/reproducing system, recorded data 2 generated by the data recording/reproducing system, and recorded data 3 reproduced by the data recording/reproducing system, in accordance with one embodiment of the present invention.
Figure 2:
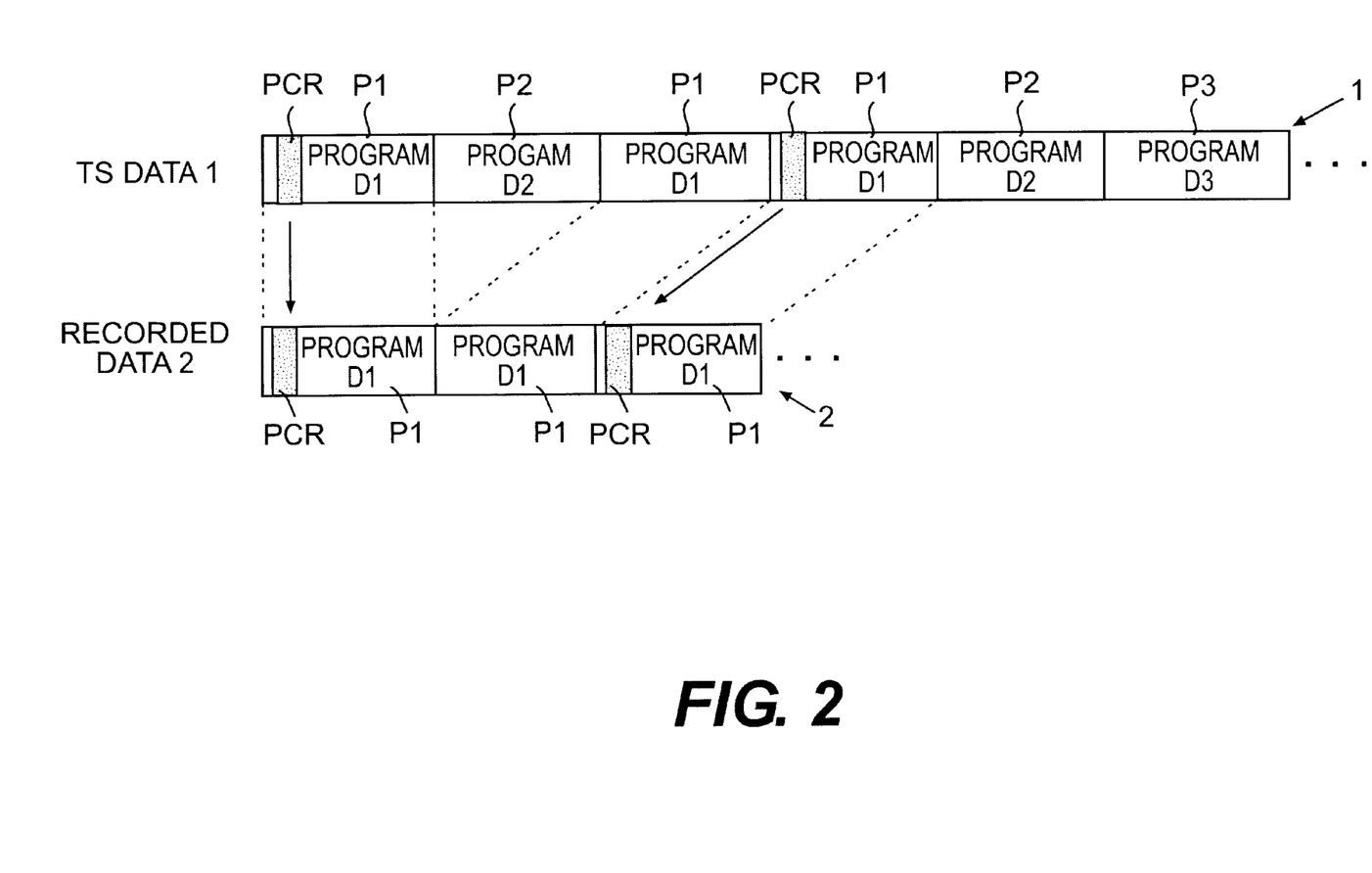
FIG. 2 is an explanatory diagram showing the amount of the TS data 1 and of the recorded data 2 according to one embodiment of the present invention.

A preferred embodiment of the present invention will be explained below with reference to FIGS. 1 through 3. It is noted that as a preferred embodiment of the present invention, an inventive data recording method will be explained by exemplifying a case of extracting and recording desired program data out of multiplexed data (hereinafter referred to as "TS data"), and the TS data includes a plurality of program data that are time-division multiplexed by the transport stream system in the MPEG 2.

At first, the structure of the TS data will be explained with reference to FIG. 1. As shown in FIG. 1, the TS data 1 includes a plurality of program data that are time-division multiplexed by the transport stream system in the MPEG 2. The program data can be sound data, picture data, image data, character data, control data, signal processing data and other types of data, or data including a combination of several types of above-mentioned data. For example, video data and audio data may be combined for reproducing a movie. The plurality of program data D1, D2 and D3 are divided into packets P1, P2 and P3 and are arrayed within the TS data 1. That is, the respective packets P1 compose the first program data D1, the respective packets P2 compose the second program data D2, and the respective packets P3 compose the third program data D3. Here, the respective packets P1, P2 and P3 have a fixed length and the packet length is 188 bytes, for example.

PCRs are disposed within the TS data 1 at predetermined intervals. The packet length of each packet does not necessarily coincide with the intervals along which the PCRs are disposed, so that there exist packets in which the PCR is disposed and packets in which no PCR is disposed. For instance, although the PCR is disposed in the packet P1 of the TS data 1, no PCR is disposed in the packets P2 and P3 as shown in FIG. 1.

Figure 3:
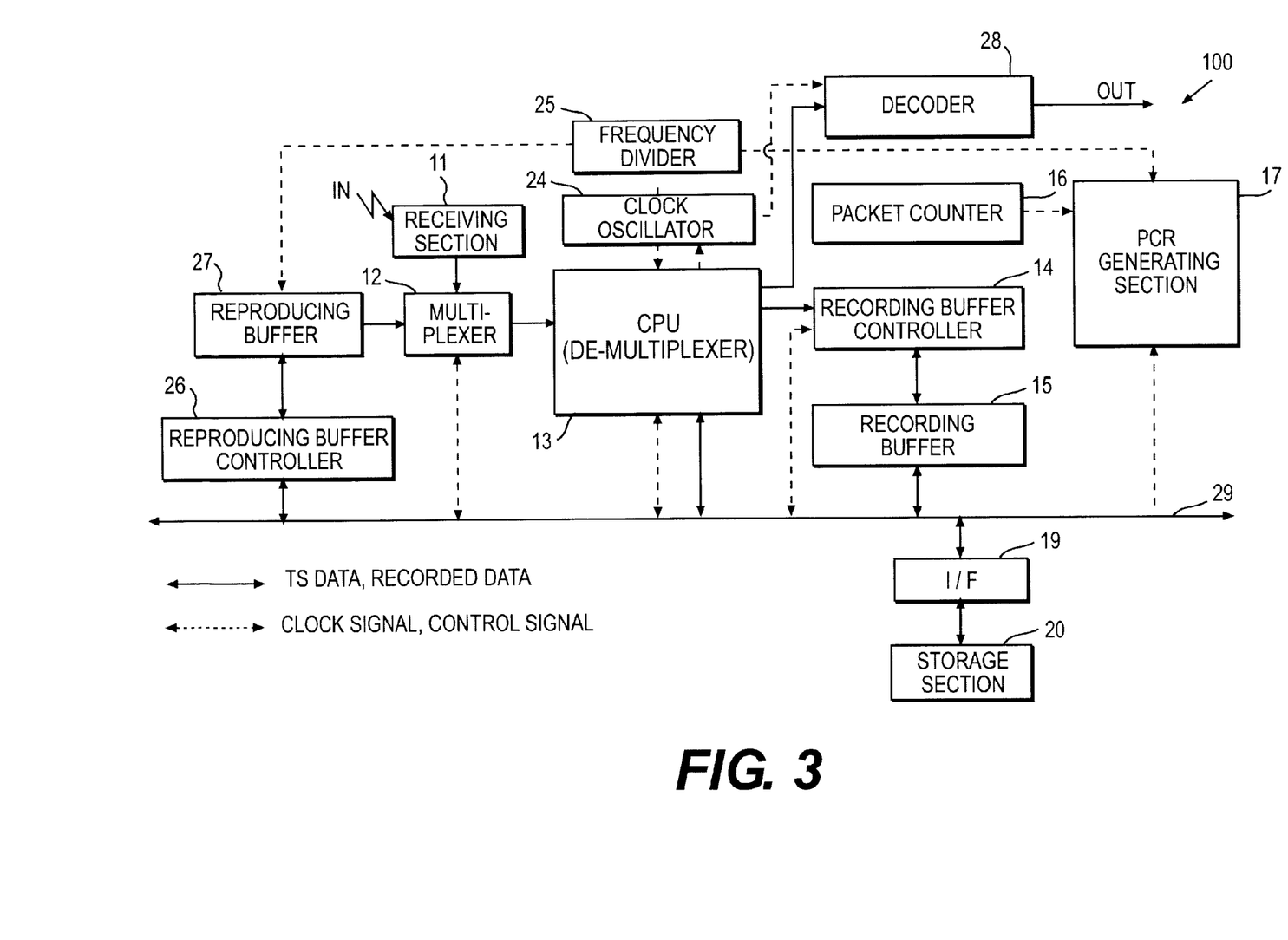
FIG. 3 is a block diagram showing the data recording/reproducing system according to one embodiment of the present invention.

The PCRs are used to synchronize the program data and a data recording/reproducing unit 100 shown in FIG. 3. In other words, a transmitter for transmitting the TS data 1 is synchronized with the data recording/reproducing unit 100 for recording or reproducing the program data within the TS data 1.

Specifically, the PCR is a time stamp calculated from a reference clock of the transmitter (an internal clock of the transmitter). The PCR is then inserted within the TS data 1 at predetermined intervals by the transmitter.

In a preferred embodiment of the present invention, a counter operating at 90 kHz and a counter operating at 27 MHz are provided within the transmitter. These two counters are synchronized. The transmitter counts time while transmitting the TS data 1 by using these two counters. Then, the transmitter generates the PCRs in which values of those two counters are recorded at a predetermined period. The PCRs are then inserted to the packets composing the TS data 1. In other words, the values recorded in the PCR are time values when the packet in which the PCR is inserted is transmitted. Thus, the values recorded in the PCR are values indicative of timing for decoding (reproducing) the packet in which the PCR is inserted. Here, the PCR includes 42 bits of actual data, wherein the value of the 90 kHz counter is recorded in the high 33 bits and the value of the 27 MHz counter is recorded in the low 9 bits.

For instance, the data recording/reproducing unit 100 shown in FIG. 3 operates an internal counter based on a reference clock signal of 27 Mhz while recording or reproducing the program data within the TS data 1 transmitted from the transmitter. The reference clock signal is outputted from a clock oscillator 24 provided within the data recording/reproducing unit 100. The data recording/reproducing unit 100 compares the PCR value with the value of the internal clock and calculates the difference every time it receives the PCR disposed in the TS data 1. Then, the data recording/reproducing unit 100 sets or calibrates the frequency of the reference clock signal so as to eliminate this difference. This is achieved by using a PLL circuit as the clock oscillator 24. This way, it becomes possible to synchronize the transmitter and the data recording/reproducing unit 100. It also becomes possible to reproduce or record the program data multiplexed into the TS data 1 transmitted from the transmitter with a high precision.

FIG. 3 shows the structure of the data recording/reproducing unit 100 of the present invention. The data recording/reproducing unit 100 performs the function of receiving the TS data 1 transmitted from the transmitter provided in a broadcasting station. The broadcasting station provides digital satellite broadcasting services, for example. The data recording/reproducing unit 100 then extracts the respective packets P1 composing a desired program data D1 out of the TS data 1, rearranges the respective extracted packets P1 to generate a recorded data 2 and recording it to a recording medium. The data recording/reproducing unit 100 also reproduces the desired program data.

As shown in FIG. 3, the data recording/reproducing unit 100 includes a receiving section 11, a multiplexer 12, a CPU 13, a recording buffer controller 14, a recording buffer 15, a packet counter 16, a PCR generating section 17, an interface 19, a storage section 20, a clock oscillator 24, a frequency divider 25, a reproducing buffer controller 26, a reproducing buffer 27, a decoder 28 and a bus 29.

The receiving section 11 receives the TS data 1 transmitted from the transmitter. The multiplexer 12 operates on the TS data 1 outputted from the receiving section 11 and sends an output to the CPU 13. Also, the multiplexer 12 operates on the recorded data 2 outputted from the reproducing buffer 27 and sends an output to the CPU 13.

The CPU 13 controls the overall operation of the data recording/reproducing unit 100, including both the recording operation and the reproducing operation of the data recording/reproducing unit 100. The CPU 13 also functions as a de-multiplexer and performs other functions. For example, the CPU 13 extracts packets composing a specific program data out of the TS data 1, and reads each PCR from the TS data 1.

The recording buffer controller 14 manages the memory, controls the recording buffer 15, and sends the packets outputted from the CPU 13 to the recording buffer 15. The recording buffer 15 temporarily holds the packets outputted from the recording buffer controller 14 and outputs the packets to the storage section 20 while regulating timing of the output corresponding to an operation rate of the storage section 20. The recording buffer controller 14 also replaces the PCR recorded in the packets together with the packet counter 16 and the PCR generating section 17 as described later. Further, the recording buffer controller 14 monitors the amount of data within the recording buffer 15 and generates and inserts null packets when data to be recorded is insufficient (not shown).

The packet counter 16 counts the number of packets inputted to the recording buffer controller 14. The PCR generating section 17 includes a sub-CPU, a multi-processing unit or the like, and generates a new PCR corresponding to a point of time of the recording operation of the data recording/reproducing unit 100. A storage area for storing the values of the PCRs and the like is provided within the PCR generating section 17. The PCR generating section 17 may be included within the CPU 13, as an alternative.

The storage section 20 may be formed of a RAM, a hard-disk, a digital VTR or the like, and stores (records) the recorded data 2 created by rearranging the packets outputted from the recording buffer 15 via the bus 29 and the interface 19. It is noted that the storage section 20 may also be formed of a magnetic disk drive, an optical disk drive, a magnetic tape recording unit or the like so as to store the packets outputted from the recording buffer 15.

The clock oscillator 24 includes a PLL circuit, and it outputs a reference clock signal of 27 MHz to the CPU 13, the decoder 28 and the frequency divider 25. The PCRs disposed in the TS data 1 are read by the CPU 13 and are outputted to the clock oscillator 24 from the CPU 13 when the program data multiplexed in the TS data 1 is recorded. Similarly, the PCRs disposed in the recorded data 2 are read by the CPU 13 and are outputted to the clock oscillator 24 from the CPU 13 when the program data recorded in the recorded data 2 is recorded. At this time, the clock oscillator 24 sets or calibrates the frequency of its own reference clock signal based on the value of the PCR outputted from the CPU 13.

The frequency divider 25 divides the reference clock signal outputted from the clock oscillator 24 and generates an internal clock signal which becomes the basis of a bit rate R in recording or reproducing the program data. This internal clock signal is supplied to the PCR generating section 17 and the reproducing buffer 27.

The bit rate R may be whatever desired value if it permits extraction of a desired program data out of the TS data 1 and reproduction thereof at a real-time basis without difficulty. That is, the bit rate R may be set arbitrarily as long as it is faster than the total bit rate of the program data extracted from the TS data 1. For instance, when the total bit rate of the program data is 4.7 MHz, the frequency divider 25 divides the reference clock of 27 MHz to $3/16$ to generate an internal clock of 5.0625 MHz and to set it as the bit rate R. It is noted that when the bit rate R is greater than 27 MHz or when the total bit rate is to be reproduced accurately, a frequency doubler may also be used if necessary.

The reproducing buffer controller 26 manages the memory, and controls the reproducing buffer 27. The reproducing buffer 27 temporarily holds the recorded data 2 read from the storage section 20 and inputted via the bus 29 and the reproducing buffer controller 26.

The decoder 28 decodes the recorded data 2 outputted from the CPU 13 based on the reference clock signal to output audio and video signals in reproducing a recorded data 3 based on the recorded data 2 stored in the storage section 20.

The program data recording operation according to the present invention will now be explained with reference to FIGS. 1 through 3. When the data recording/reproducing unit 100 starts the recording operation, the receiving section 11 receives the TS data 1 transmitted from the transmitter and inputs it to the CPU 13 via the multiplexer 12 as shown in FIG. 3.

The CPU 13 reads the PCRs disposed in the TS data 1 and outputs them to the clock oscillator 24. Based on the PCRs outputted from the CPU 13, the clock oscillator 24 sets or calibrates the frequency of the clock signal. As a result, the synchronization between the transmitter and the data recording/reproducing unit 100 is established.

In parallel with the above process for establishing the synchronization, the CPU 13 extracts the packets P1 composing the desired program data D1 out of the plurality of program data multiplexed in the TS data 1, and outputs the extracted packets P1 to the recording buffer controller 14. In addition, it is also possible to send the packets P1 to the decoder 28 for decoding by using the reference clock signal and to output the audio and video signals from the decoder 28. Meanwhile, the CPU 13 discards the packets P2 and P3 composing the undesired program data D2 and D3.

The recording buffer controller 14 receives the packet P1 outputted from the CPU 13 and judges whether or not the PCR is disposed within the packet P1. When it is determined that the PCR is disposed within the packet P1, the recording buffer controller 14 also determines whether or not the PCR is the PCR read for the first time since the start of the recording operation (hereinafter referred to as the "initial PCR"). When it is determined that the PCR is the initial PCR, the recording buffer controller 14 outputs the value $T_0$ of the initial PCR to the PCR generating section 17. The initial PCR is thus stored in the storage area provided within the PCR generating section 17. Then, the packet P1 in which the initial PCR is disposed is outputted from the recording buffer controller 14 to the recording buffer 15. No PCR replacing process is implemented to the packet P1 in which the initial PCR is disposed.

If no PCR is disposed within the packet outputted from the CPU 13 to the recording buffer controller 14, the recording buffer controller 14 outputs that packet as it is to the recording buffer 15.

If a PCR is disposed within the packet outputted from the CPU 13 to the recording buffer controller 14 and the PCR is not the initial PCR, the recording buffer controller 14 executes the PCR replacing process together with the packet counter 16 and the PCR generating section 17.

In the PCR replacing process, the PCR generating section 17 calculates a new PCR value T by using the following formula (2):

$$T=(N \times L/R)+T_0 \qquad (2)$$

Where R is the recording or reproducing bit rate of the data recording/reproducing unit 100, N is the number of packets counted during the time from when the initial PCR was read till when the PCR of this time is read (ie., the number of packets starting from the packet in which the initial PCR is recorded to the packet just before the packet in which the PCR of this time is recorded), L is the packet length, and $T_0$ is the value of the initial PCR. It is noted that the null packets inserted to the aforementioned recorded data are also counted.

Here, the recording or reproducing bit rate R of the data recording/reproducing unit 100 is set based on the internal clock signal outputted from the frequency divider 25 to the PCR generating section 17. The packet counter 16 outputs the number of packets N counted during the time from when the initial PCR has been read till when the PCR of this time is read. In other words, the packet counter 16 counts the number of packets inputted to the recording buffer controller 14 and outputs this count value to the PCR generating section 17. It is noted that the packet counter 16 starts to count the packets when the initial PCR is read. The packet length L is, for example, 188 bytes, and is decided beforehand. The packet length L is stored in the storage area of the PCR generating section 17, so that it may be used for the calculation. The value of the initial PCR $T_0$ is also stored in the storage area of the PCR generating section 17 as described before, so that it may be used for the calculation.

Then, the PCR generating section 17 outputs the new PCR value T calculated by using the above formula (2) to the recording buffer controller 14. The recording buffer controller 14 replaces the PCR value recorded in the packet with the new PCR value T. Then, it outputs the packet with the replaced new PCR value T to the recording buffer 15.

The packet outputted to the recording buffer 15 is stored in the storage section 20 via the bus 29 and the interface 19 for the storage section. The recording buffer 15 outputs the packets to the storage section 20 with the bit rate R set based on the internal clock signal. As a result, the packets extracted from the TS data 1 are rearranged, thus creating the recorded data 2 shown in FIG. 1. The recorded data 2 is recorded in the storage section 20.

Accordingly, the data recording/reproducing unit 100 of the present invention allows extraction and storage of a desired program data out of the TS data 1 including a plurality of multiplexed program data. This reduces the amount of data to be recorded. For instance, when the amount of the TS data 1 is compared with the amount of the recorded data 2, the latter is much smaller than the former as shown in FIG. 2.

The operation for reproducing the program data recorded in the storage section 20, i.e., the recorded data 2, by the data recording/reproducing unit 100 will now be explained with reference to FIGS. 1 and 3.

When the data recording/reproducing unit 100 starts the reproducing operation, the recorded data 2 stored in the storage section 20 is outputted at first to the reproducing buffer controller 26 via the interface 19 for the storage section and the bus 29 per packet P1. Then, the reproducing buffer controller 26 outputs the packets P1 received from the storage section 20 successively to the reproducing buffer 27. The reproducing buffer 27 outputs the packets P1 to the multiplexer 12 in succession with the bit rate R set based on the internal clock signal outputted from the frequency divider 25. Then, the packets P1 are inputted to the CPU 13 from the multiplexer 12.

When the packets P1 are inputted to the CPU 13, the CPU 13 reads the PCRs recorded in the packets P1 and outputs them to the clock oscillator 24. Based on the values of the PCRs outputted from the CPU 13, the clock oscillator 24 sets or calibrates the reference clock signal.

The value of the PCR used for setting or calibrating the reference clock signal at this time is the new PCR value T generated by the PCR replacing process described above. Accordingly, the synchronization between the recorded data 2 stored in the storage section 20 and the data recording/reproducing unit 100 is established with a high precision. Consequently, the recorded data 2 may be decoded and reproduced as the recorded data 3 (as shown in FIG. 1) with a high precision.

Then, the packets P1 of the recorded data 2 inputted to the CPU 13 are transformed into audio and video signals by the decoder 28 based on the reference clock signal and are outputted to a speaker and a monitor (not shown).

Thus, the data recording/reproducing unit 100 of the present invention allows extraction and recording of the packets composing a desired program data out of the TS data. This reduces the amount of data to be recorded.

Further, in extracting and recording packets composing a specific program data out of the TS data 1, because the PCR value which has been disposed in the packet is replaced with the new PCR value T calculated based on the bit rate set by the internal clock signal of the data recording/reproducing unit 100, the recorded data 2 stored in the storage section 20 and the data recording/reproducing unit 100 may be synchronized with a high precision. This allows the recorded data 2 to be reproduced with a high precision.

Although the embodiment described above concerns extracting and recording a desired program data out of the TS data multiplexed by the transport stream system in the MPEG 2, the present invention is not confined to such a case. For example, the present invention is applicable also to a case of extracting and recording a desired program data out of other multiplexed data arranged such that (i) a plurality of program data are time-division multiplexed by packets, (ii) a plurality of time preset values used in synchronizing one program data and a decoder in decoding at least one program data out of the multiplexed plurality of program data are provided in advance at predetermined intervals, and (iii) one program data and the decoder are synchronized based on the value of each time preset value received by the decoder every time when they are received.

Further, although the embodiment described above calculates the new PCR value T by using the number of packets N counted during the time from when the initial PCR has been read till when the PCR of this time is read, the present invention is not confined only to such a case. For example, the new PCR value T may be calculated by using the number of packets counted during the time from when the previous PCR has been read till when the PCR of this time is read.

Still further, although the embodiment described above applies to the data recording/reproducing unit 100 having both the data recording and data reproducing functions, the present invention is not confined only to such a case. For example, the present invention is applicable to a data recording unit having only the data recording function.

It is noted that the TS data is merely one example of the multiplexed data, and the PCR is merely one example of the time preset value. The present invention applies equally to other types of multiplexed data and time preset values.

As described in detail above, according to the inventive data recording method of the present invention, each time preset value disposed in advance in the multiplexed data is replaced with a new time preset value. The new time preset value is generated based on the bit rate at the time of recording when at least one desired program data is extracted out of the multiplexed data including a plurality of time-division multiplexed program data. This reduces the amount of data to be recorded. Further, this synchronizes the recorded desired program data and the decoder (reproducing unit) with a high precision. Also, the desired program data is decoded and reproduced by using the new time preset value disposed in the recorded desired program data, thus done with the same bit rate at the time of recording.

According to the present inventive data recording method, the time preset value used in establishing the synchronization in decoding and reproducing operations may be readily generated by performing a calculation based on above-described formula (2). In other words, the time preset value depends on the number of packets N, the packet length L, the bit rate R, and the time $T_0$ when the previous time preset value was received.

According to the present invention, the bit rate can be set by dividing the clock frequency used in counting the value of the respective time preset values arrayed in advance in the multiplexed data. As a result, the bit rate may be set with a simple arrangement without providing an additional oscillator. Only a frequency divider is required. Further, the new time preset value generated may be set as a value of 1/n of the time preset value disposed in advance in the multiplexed data, so that the process for establishing the synchronization in reproducing the program data extracted and recorded out of the multiplexed data may be simplified.

As described above, the present invention also teaches a data recording system which utilizes the inventive data recording method described above and brings about the same effects.

It will be apparent to those skilled in the art that various modifications and variations can be made in the data recording method and data recording system of the present invention without departing from the spirit or scope of the invention. Thus, it is intended that the present invention cover the modifications and the variations of this invention provided they come within the scope of the appended claims and their equivalents.

What is claimed is:

1. A data recording method for extracting and recording at least one program data from received multiplexed data, the multiplexed data including a plurality of program data which are time-division multiplexed by packets, wherein a plurality of time preset values for synchronizing said at least one program data and a decoder are provided in advance at predetermined intervals in the packets, the data recording method comprising the steps of:

receiving each of the plurality of time preset values;

generating a new time preset value based on each of the plurality of time preset values received and based on a bit rate R; and replacing each of the plurality of time preset values provided in advance with the new time preset value for each of the packets composing said at least one program data, and recording each of the packets composing said at least one program data, thus synchronizing said at least one program data and the decoder.

2. A data recording method for extracting and recording at least one program data from received multiplexed data, the multiplexed data including a plurality of program data which are time-division multiplexed by packets, wherein a plurality of time preset values for synchronizing said at least one program data and a decoder are provided in advance at predetermined intervals in the packets, the data recording method comprising the steps of:

receiving each of the plurality of time preset values;

generating a new time preset value based on each of the plurality of time preset values received and based on a bit rate R; and replacing each of the plurality of time preset values provided in advance with the new time preset value for each of the packets composing said at least one program data, and recording each of the packets composing said at least one program data, thus synchronizing said at least one program data and the decoder;

wherein the packets have a fixed length L; and wherein the step of generating a new time preset value (T) includes calculating by using a number of packets N composing said at least one program data extracted out of the multiplexed data and counted during a time period from when a previous time preset value was received till when a present time preset value is received, the fixed length L of the packets, a time $T_0$ when the previous time preset value was received, and the bit rate R, as follows:

$$T=(N{\times}L/R)+T_0$$

3. The data recording method according to claim 2, wherein the previous time preset value is a time preset value received for a first time since said at least one program data has started to be recorded.

4. The data recording method according to claim 1, wherein the multiplexed data is multiplexed by a transport stream system according to Moving Picture Expert Group (MPEG) Standard and each of the plurality of time preset values is a program clock reference (PCR) in the MPEG Standard.

5. The data recording method according to claim 1, wherein the bit rate is set by dividing a clock frequency.

6. A data recording system for extracting and recording at least one program data from received multiplexed data, the multiplexed data including a plurality of program data which are time-division multiplexed by packets, wherein a plurality of time preset values for synchronizing said at least one program data and a decoder are provided in advance at predetermined intervals in the packets, the data recording system comprising:

a receiving section for receiving the plurality of time preset values;

a generating section for generating a new time preset value based on each of the plurality of time preset values received by the receiving section and based on a bit rate R; and a replacing section for replacing each of the plurality of time preset values provided in advance with the new time preset value for each of the packets composing said at least one program data, and recording each of the packets composing said at least one program data, thus synchronizing said at least one program data and the decoder.

7. A data recording system for extracting and recording at least one program data from received multiplexed data, the multiplexed data including a plurality of program data which are time-division multiplexed by packets, wherein a plurality of time preset values for synchronizing said at least one program data and a decoder are provided in advance at predetermined intervals in the packets, the data recording system comprising:

a receiving section for receiving the plurality of time preset values;

a generating section for generating a new time preset value based on each of the plurality of time preset values received by the receiving section and based on a bit rate R; and a replacing section for replacing each of the plurality of time preset values provided in advance with the new time preset value for each of the packets composing said at least one program data, and recording each of the packets composing said at least one program data, thus synchronizing said at least one program data and the decoder;

wherein the packets have a fixed length L; and wherein the new time preset value T is calculated by using a number of packets N composing said at least one program data extracted out of the multiplexed data and counted during a time period from when a previous time preset value was received till when a present time preset value is received, the fixed length L of the packets, a time $T_0$ when the previous time preset value was received, and the bit rate R, as follows:

$$T=(N \times L/R)+T_0$$

8. The data recording system according to claim 7, wherein the previous time preset value is a time preset value received for a first time since said at least one program data has started to be recorded.

9. The data recording system according to claim 6, wherein the multiplexed data is multiplexed by a transport stream system according to Moving Picture Expert Group (MPEG) Standard and each of the plurality of time preset values is a program clock reference (PCR) in the MPEG Standard.

10. The data recording system according to claims 6, wherein the bit rate is set by dividing a clock frequency.

11. The data recording system according to claim 6, wherein the receiving section includes:

a receiver for receiving the multiplexed data from a transmitter; and a processor for demultiplexing the multiplexed data and reading the time preset values disposed in the multiplexed data.

12. A data recording system for extracting and recording at least one program data from received multiplexed data, the multiplexed data including a plurality of program data which are time-division multiplexed by packets, wherein a plurality of time preset values for synchronizing said at least one program data and a decoder are provided in advance at predetermined intervals in the packets, the data recording system comprising:

a receiving section for receiving the plurality of time preset values;

a generating section for generating a new time preset value based on each of the plurality of time preset values received by the receiving section and based on a bit rate R; and a replacing section for replacing each of the plurality of time preset values provided in advance with the new time preset value for each of the packets composing said at least one program data, and recording each of the packets composing said at least one program data, thus synchronizing said at least one program data and the decoder;

wherein the generating section includes:

a packet counter for counting the number of packets received which composes said at least one program data; and a time preset value generator for generating the new time preset value based on the number of packets counted by the packet counter, the bit rate, and the time preset values received.

13. The data recording system according to claim 6, further comprising:

a clock oscillator for outputting a reference clock signal based on the time preset values received; and a frequency divider for determining the bit rate based on the reference clock signal.

* * * * *